United States Patent [19]

Preston

[11] 3,774,204
[45] Nov. 20, 1973

[54] SELF COHERENT ADAPTIVE LANDING SYSTEM

[75] Inventor: Billie W. Preston, Littleton, Colo.

[73] Assignee: Martin Marietta Corporation, New York, N.Y.

[22] Filed: Mar. 23, 1971

[21] Appl. No.: 127,128

[52] U.S. Cl. .................... 343/7 ED, 343/8, 343/9
[51] Int. Cl. ............................................ G01s 9/44
[58] Field of Search .......................... 343/8, 9, 7 ED

[56] References Cited
UNITED STATES PATENTS
3,472,471   10/1969   Badewitz ..................... 343/7 ED X

*Primary Examiner*—T. H. Tubbesing
*Attorney*—Phillip L. DeArment, Martin Marietta and Gay Chin

[57] ABSTRACT

The present invention relates to a radar method and radar apparatus for controlling the attitude and terminal descent of an interplanetary vehicle and, more particularly, to improvements in such a system which comprise the use of one central radar beam of frequency $F1$ which is directed parallel to the roll axis of the vehicle and at least two other radar beams of frequency $F2$ which are directed downwardly from the vehicle together with associated basic radar R.F. means to provide all conversion computations and adaptations required without the use of scale factors and coordinate conversions and where the radar outputs connect directly to the attitude control system through simple logic elements.

6 Claims, 10 Drawing Figures

$F_1 = F_2 \cos b$ $D_1 = 2VF_2 \cos(b-B)$ $D_5 = 2VF_2 \cos(b+B)$ $D_3 = \dfrac{2VF_1 \cos B}{C} = \dfrac{2VF_2 \cos b \cos B}{C}$

FOR CASE SHOWN $D_1 > D_2 > D_5$

FOR $B = 0$ $D_1 = D_2 = D_5 = \dfrac{2VF_2 \cos b}{C}$

RELATION BETWEEN FREQUENCY AND BEAM ANGLE
(PITCH AXIS EXAMPLE)

* HARD LANDING
** SOFT LANDING

SELF COHERENT ADAPTIVE LANDING SYSTEM

Multibeam doppler radar systems have seen wide development and use in aircraft navigation where high accuracy is required and greater weight loads can be tolerated. To date, lunar landing craft such as the "Surveyor" and the "LEM" have, in fact, employed such basic aircraft systems to determine range and relative velocity, modified and adapted to accommodate the conditions of range and velocity encountered by a lander space vehicle. Typical prior art systems are complex and require, in addition to the basic radar components, computers to process the raw radar data and use it in conjunction with other inputs to provide properly scaled inputs to the steering and control mechanisms of a lander vehicle. Moreover, present systems are restricted in their use due to the necessity that the radar be aligned to local vertical and must operate in conjunction with an inertial reference.

Therefore, it is the primary object of the present invention to provide a basic method of doppler radar control for interplanetary landers which will produce the minimum required data by the simplest and most reliable means possible.

A correlative and complementary purpose of the improvements embodied in the present invention is the demonstration of the technique of directly comparing raw doppler radar data with developed error signals without conversion to a specific scale factor or system of reference directions.

Inasmuch as there exist great uncertainties relative to the conditions under which a lander vehicle will be operating, it is impractical to pre-program the lander attitude in order to maintain the required radar alignment. Hence, it is a further object of this invention to provide a system for full attitude and descent control of a re-throthrust system for a planetary landing of manned or unmanned vehicles.

Other and further objects and features of the invention will become apparent or be pointed out in the following detailed description of the technique and method and the following basic description of a preferred form of the basic apparatus for carrying out the invention taken in connection with the accompanying drawings in which:

The general operation of the system and technique of the present invention may be basically described as one which utilizes the self coherent nature of radar outputs to control the alignment of the lander vehicle so as to maintain the roll axis radar beam coaxial or parallel to the true velocity vector of the vehicle with respect to the surface being approached. Under such a condition, the true velocity and range to impact are derived only from the roll axis beam. Use of information derived from other radar beams in the system is limited to that needed for comparison with the roll axis beam velocity output and to thus maintain proper alignment of the vehicle.

Either a pure digital or hybrid type of technique can effectively be used to process the radar data.

Figure 1:
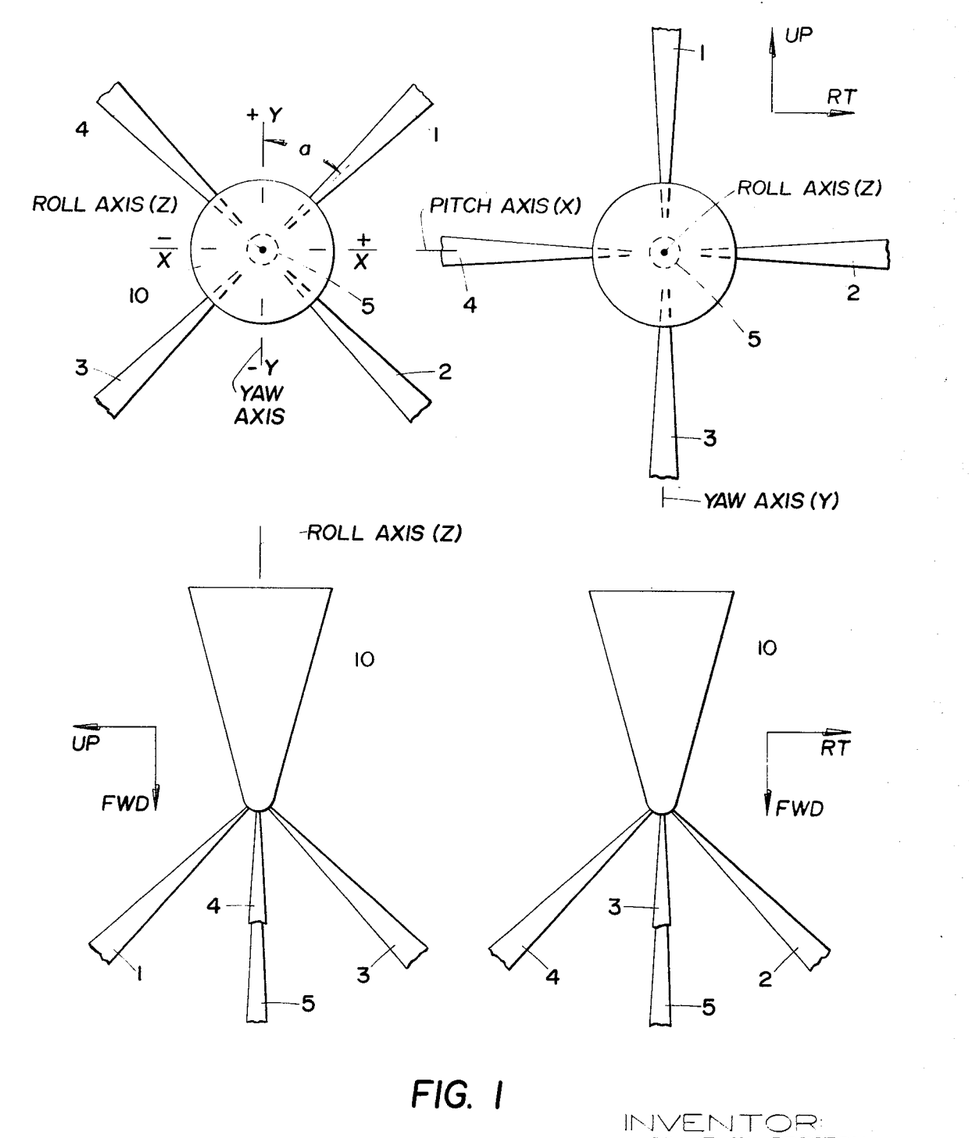
FIG. 1 is a series of end and elevational diagramatic views of a space vehicle showing the relationships thereto of the five beam radar system of the present invention.
Figure 2:
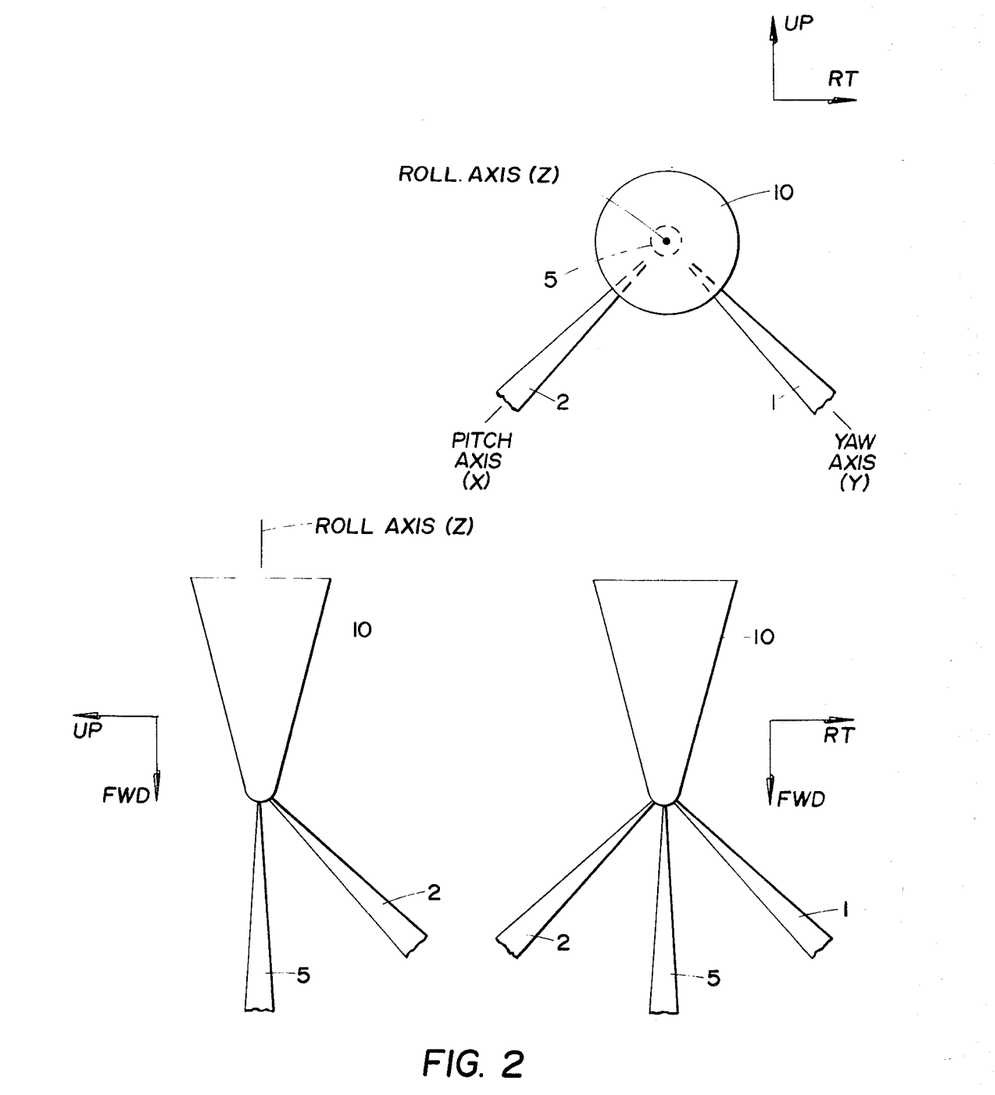
FIG. 2 is a series of end and elevational diagramatic views of a space vehicle showing the relationships thereto of the three beam radar system of the present invention.
Figure 3:
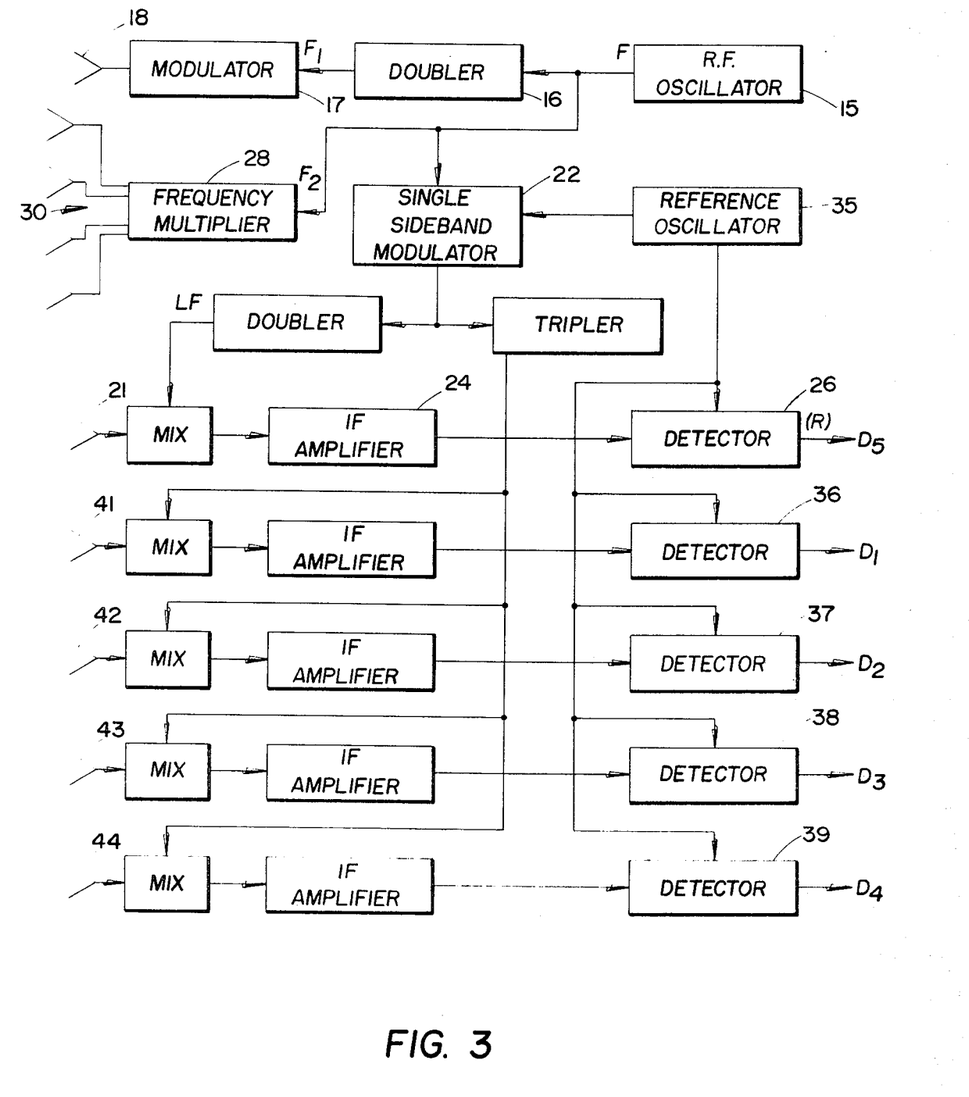
FIG. 3 is a block diagram of the R.F. system of the present invention.
Figure 4:
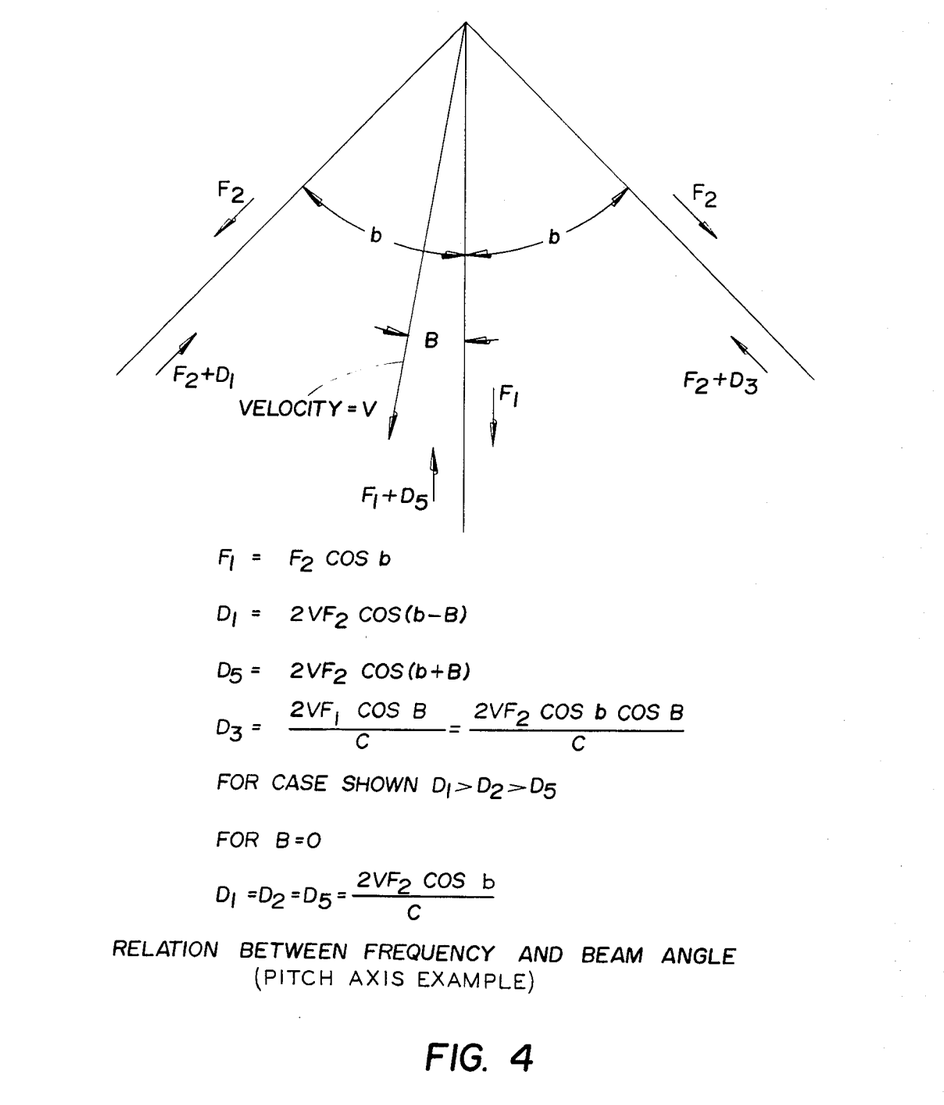
FIG. 4 is a pitch axis exemplary diagram showing the relationship between frequency and angle of the radar beam.

FIGS. 1 – 3 illustrate the preferred configuration of the radar beams as pictured with respect to a planetary landing vehicle. The "master," or previously referred to "roll axis beam" 5 is parallel to or, preferably, coaxial with, the longitudinal or "roll axis" (Z) of the lander vehicle 10. Additional and splayed radial radar beams 1, 2, 3 and 4, are located so as to form the elements of an imaginary cone with the master beam 5 being the axis of the cone. The cone forming radial beams are symmetrically located at 90° intervals around the cone. For reference and explanation purposes, the beam referred to by the reference numeral 1 may be considered as up, with the beam referred to as 2 being directed to the right, with 3 being downward, and 4 to the left (See FIG. 1).

In a three beam system which may be used if the vehicle has a fixed roll attitude, the radar beam locations are modified to locate one beam downward and to the right while the second beam is oriented downward and to the left (See FIG. 2).

The angle between the roll axis beam 5 and each of the other beams is critical and is defined as $COS^{-1}(F_1/F_2)$, where $F_1$ is the transmitting frequency of the master beam 5 and $F_2$ is the transmitting frequency of the other beams. Such relationship is the key factor in implementation of the method employed in the present invention for producing steering commands for an attitude control system which are derived directly from the radar returns.

Referring now to the diagram of FIG. 3 which describes the overall R. F. system, it may be seen that an R. F. oscillator 15 is provided to produce a stabilized output at a frequency $F$ which is a sub-harmonic of the central beam 5 transmitting frequency $F_1$ and also of the frequency $F_2$ which is the frequency transmitted by the splayed radial beams 1 through 4. As will be subsequently pointed out, this is the characteristic which permits the simplified comparison technique employed in the data processing aspects of the present invention. The R.F. oscillator frequency $F$ is amplified and multiplied by the frequency doubler 16 to produce frequency $F_1$ which is then modulated by a modulator unit 17 employing any one of several known techniques to provide a timing reference for range measurement. Such techniques might include pulse modulation, interrupted CW, frequency modulation and frequency shift keying. The modulated electromagnetic energy of frequency $F_1$ is then transmitted by means of the central roll axis antenna 18.

The energy reflected by the surface being approached is received by a roll axis receiving antenna 21. The reflected signal contains range and velocity information in the form of the round trip time required for the signal to be transmitted and reflected and the doppler shift in the frequency of the transmitted energy. The reflected signal is received and mixed with the output of a coherent local oscillator frequency $LF_1$ which is derived from the output of the R.F. oscillator 15 by a single sideband modulator 22.

The resulting intermediate frequency is amplified by an IF amplifier 24 and redetected by a detector 26 to produce range information ($R$) and velocity information ($D5$) in much the same manner as in a conventional radar altimeter with a doppler velocity capability.

The splayed radar beams are also generated in the R.F. oscillator 15 whose output is directed to a frequency multiplier 28 to produce an output frequency of $F_2$ which is transmitted without modulation on a plurality of beam antennas 30. The splayed beams form a conventional CW doppler radar system except for the novel methods of generating the R.F. and of processing the return data. With respect to the generation of the R.F., it can briefly be stated that the frequency is scaled to the angle of beam off-set so that the doppler shift is the same for each antenna when the space vehicle is aligned with the velocity vector.

The relationship between the transmitting frequency $F_2$ and the splayed beam angles can be illustrated by reference to FIG. 3. The R.F. oscillator 15 produces an output, for example, of 5 $GH_z$(F). This output frequency is multiplied by two in doubler 16 to provide the frequency $F_1$ frequency of $10GH_z$ and multiplied by three in the multiplier 28 to provide $F_2$ of 15 $GH_z$. The angle ($b$) between the central radar beam 5 and each of the other splayed radial beams 1, 2, 3 and 4 is defined as being equal to $COS^{-1} F_1/F_2$. Applying the above determined frequencies of $F_1$ and $F_2$ to the equation:

$$b = COS^{-1} \tfrac{2}{3}$$
$$b = 48° 11.5'$$

It has been found and determined through the present invention that when the splayed radial beams are aligned at this angle and the transmitted frequencies are $F_1$ and $F_2$, as applied in the equation, the doppler shifts of all beams will be equal when the central or roll axis beam 5 is parallel to the true velocity vector.

The ratio between the two frequencies may be any value which provides a usable angle. For example:

| Center Beam Multiplier | Velocity Beam Multiplier | REQUIRED ANGLE |
| --- | --- | --- |
| 2 | 3 | 48° 11.5' |
| 3 | 4 | 41° 24.5' |
| 4 | 5 | 36° 52' |
| 5 | 6 | 33° 33.5' |
| 6 | 7 | 31° |
| 7 | 8 | 28° 57' |
| 9 | 10 | 25° 50.5' |
| 25 | 16 | 20° 22' |
| 25 | 26 | 16° 15.5' |
| 35 | 36 | 13° 32' |

The choice of angles which determines the frequency ratio is based on vehicle mission analysis. In general, the larger angles ($a$) give better resolution and the small angles give great sensitivity.

A similar method is employed to determine the coherent local oscillator frequencies (LF). Although other orders of mixing and multiplying can easily be used, the example for the embodiment of FIG. 3 is as follows: For an output frequency of 15 MHz from the reference oscillator 35, the coherent local oscillator output $LF_1$ will be 10.03 GHz to provide an intermediate frequency $IF_1$ of 30 MHz. A coherent local oscillator frequency of 15.045 GHz will produce an intermediate frequency $IF_2$ of 45 MHz. By changing the order in which the mixing and multiplying occurs, the frequencies may be modified. The key factor in the generation of the various frequencies is that they must all be coherent, that is, with fixed phase relationships, in order to provide for direct comparison of doppler shifts.

Having thus described the method of selecting and deriving the radar beam frequencies, it now will be shown how the reflected energy can be directly compared in the data processing portion of the apparatus.

The doppler shift in a radar beam is a function of the transmitted frequency $F$ ( ) (subscripts referring to the beam by number identifier with five beams being assumed for the general case to be derived) and the velocity component which is coaxial with the beam. $D$ ( )$= 2V[F$ ( )$/C]$ where $C$ equals the velocity of light measured in the same units as the velocity of the space vehicle $V$ along the subscript reference. Where the radar beam is not coaxial with the velocity of the vehicle, the equation becomes $$D_0 = 2V\, F\, (\,)\, COS\ angle/C$$

where "angle" is the angle between the velocity vector and the axis of the beam.

For the general case comprising a five beam system and with the velocity of the vehicle not in alignment with any beam, the following velocity equations can be written:

$V_1 = \sin a \sin b\, V_x + COS\, a \sin b\, V_y + COS\, b\, V_z$
$V_2 = \sin a \sin b\, V_x - COS\, a \sin b\, V_y + COS\, b\, V_z$
$V_3 = -\sin a \sin b\, V_x - COS\, a \sin b\, V_y + COS\, b\, V_z$
$V_4 = -\sin a \sin b\, V_x + COS\, a \sin b\, V_y + COS\, b\, V_z$
$V_5 = V_z$ where: $x$, $y$ and $z$ represent the cartesian coordinate axis of a three dimensional system:

1, 2, 3, 4 and 5 represent beam identifiers and are identical to reference numerals in the drawings;

$a$ equals the angle between the yaw axis ($y$) and radial beam 1, measured in the XY plane;

$b(\ )$ equals the angle between each radial beam and the vehicle roll axis (Z);

$F_5$ is equivalent to $F_1$ in the special case of the preferred embodiment and $F_{1,2,3,4}$ are equivalent to $F_2$ of the described embodiment.

For the special cases where a beam is in alignment with the velocity vector, the equations become:

$V_1 = \sin b\, V_y + COS\, b\, V_z$
$V_2 = \sin b\, V_x + COS\, b\, V_z$
$V_3 = -\sin b\, V_y + COS\, b\, V_z$
$V_4 = -\sin b\, V_x + COS\, b\, V_z$ Using the doppler equation above and converting from subscript velocities, the equations become:

$D_1 = 2V_y\, F_1 \sin b_1/C + 2\, V_z\, F_1\, COS\, b_1/C$
$D_2 = 2V_x\, F_2 \sin b_2/C + 2V_z\, F_2\, COS\, b_2/C$
$D_3 = -2V_y\, F_3 \sin b_3/C + 2V_z F_3\, COS\, b_3/C$
$D_4 = -2V_x F_4 \sin b_4/C + 2V_z\, F_4\, COS\, b_4/C$
$D_4 = 2V_z\, F_5/C$ For a symmetrical case: $F_1 = F_2 = F_3 = F_4$ and $b_1 = b_2 = b_3 = b_4$. During active steering of the vehicle $V_x$ and $V_y$ will be forced to zero and the desired condition for simple processing is arrived at, to-wit: $D_1 = D_2 = D_3 = D_4 = D_5$ when $D_1 = D_5$ then: $2V_z F_1\, COS\, b_1/C = 2V_z\, F_5/C$ and $F_1\, COS\, b = F_5$ Solving the doppler equations for the velocity terms with the frequencies related by COS b: $V_x = (D_z - D_5) C/2F_1 \sin b = (D_5 - D_4)C/2F_1 \sin b = (D_z - D_4) C/4F_1 \sin b$ $V_y = (D_1 - D_5)C/2F_1 \sin b = (D_5 - D_3) C/2F_1 \sin b = (D_1 - D_3) C/4F_1 \sin b$ $V_z = D_5 C/2F_5 = D_5 C/2F_1 \cos b = (D_1 + D_3) C/4F_1 \cos b = (D_2 + D_4) C/4F_1 \cos b$ Inspection of the foregoing equations verifies that any three non-coplanar beams may be used to derive the various component velocities. For a steering regime which drives $V_x + V_y$ to zero the steering error signals may be derived by direct comparison of doppler pairs: i.e., $\text{Error}_x \approx D_2 - D_5 \approx D_5 - D_4$, etc.

$D_{1,2,3,4}$ information is derived from detectors 36, 37, 38 and 39 (FIG. 3) which function in the same fashion as the central beam detector 26 except that each of the detectors 36 – 39 obtain their data from the radial beam reflected energy receiving antennas 41, 42, 43, and 44.

Figure 5A:
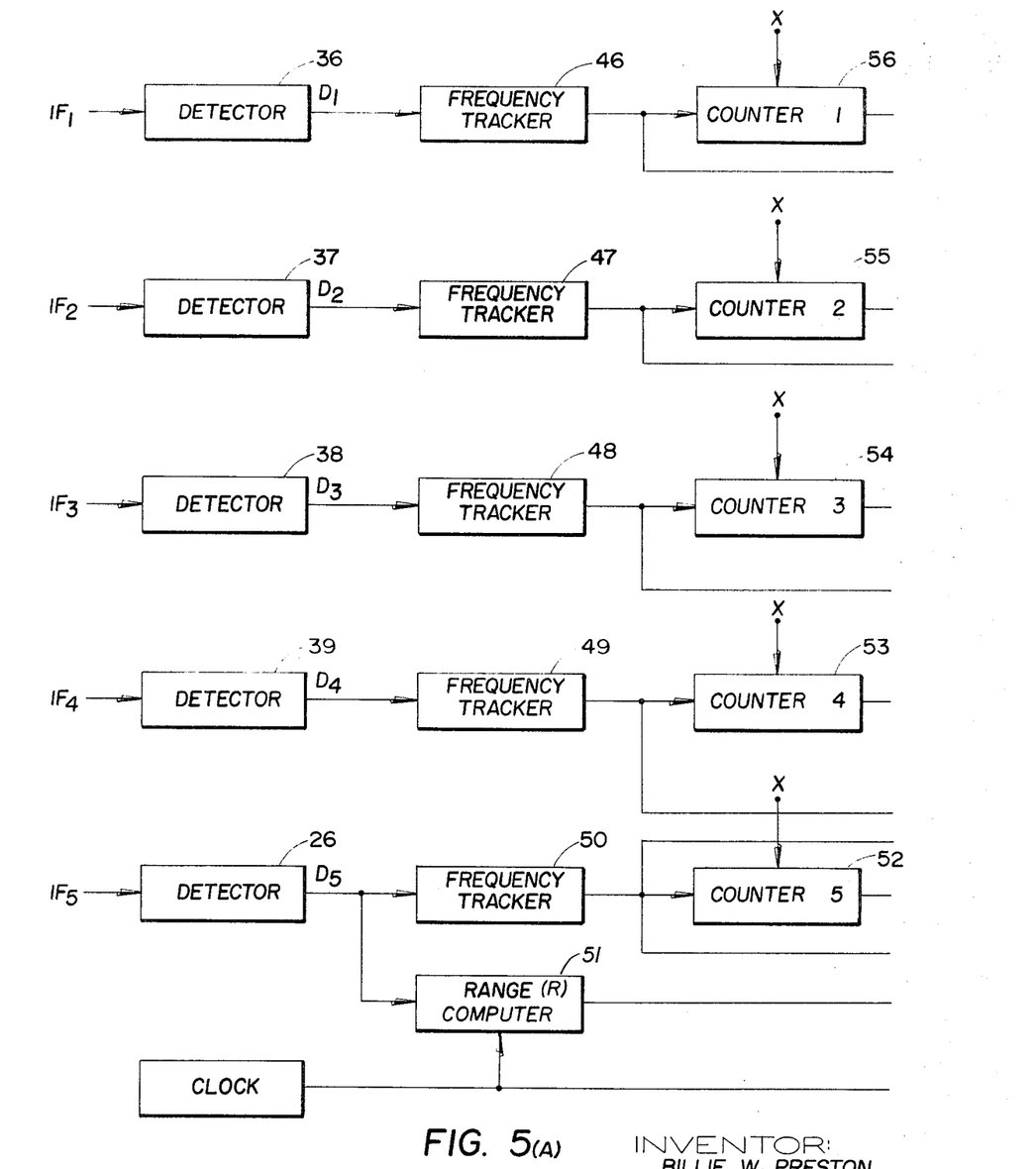
FIGS. 5a–5c is a block diagram of the digital data processor of the present invention.
Figure 5B:
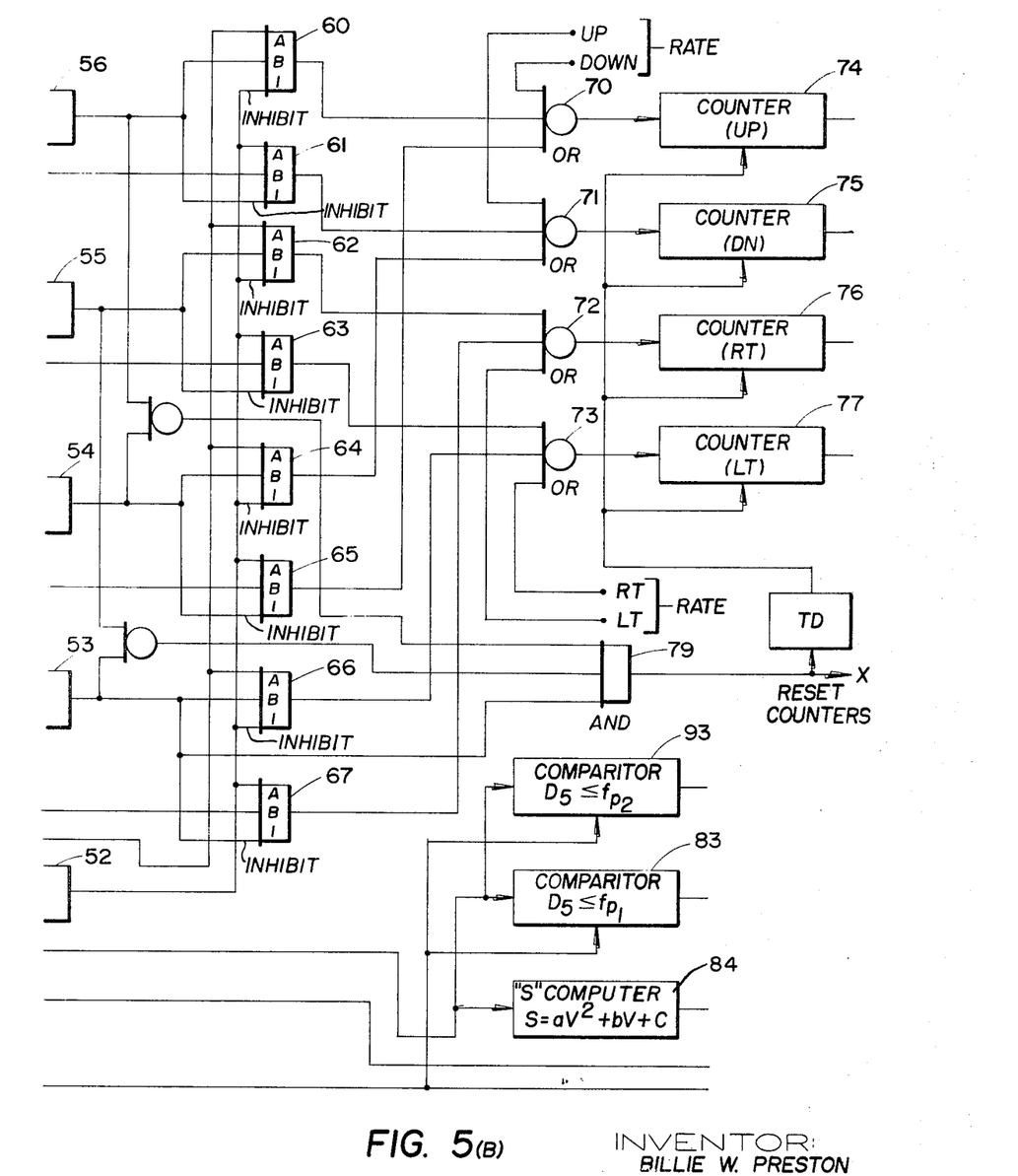
Figure 5C:
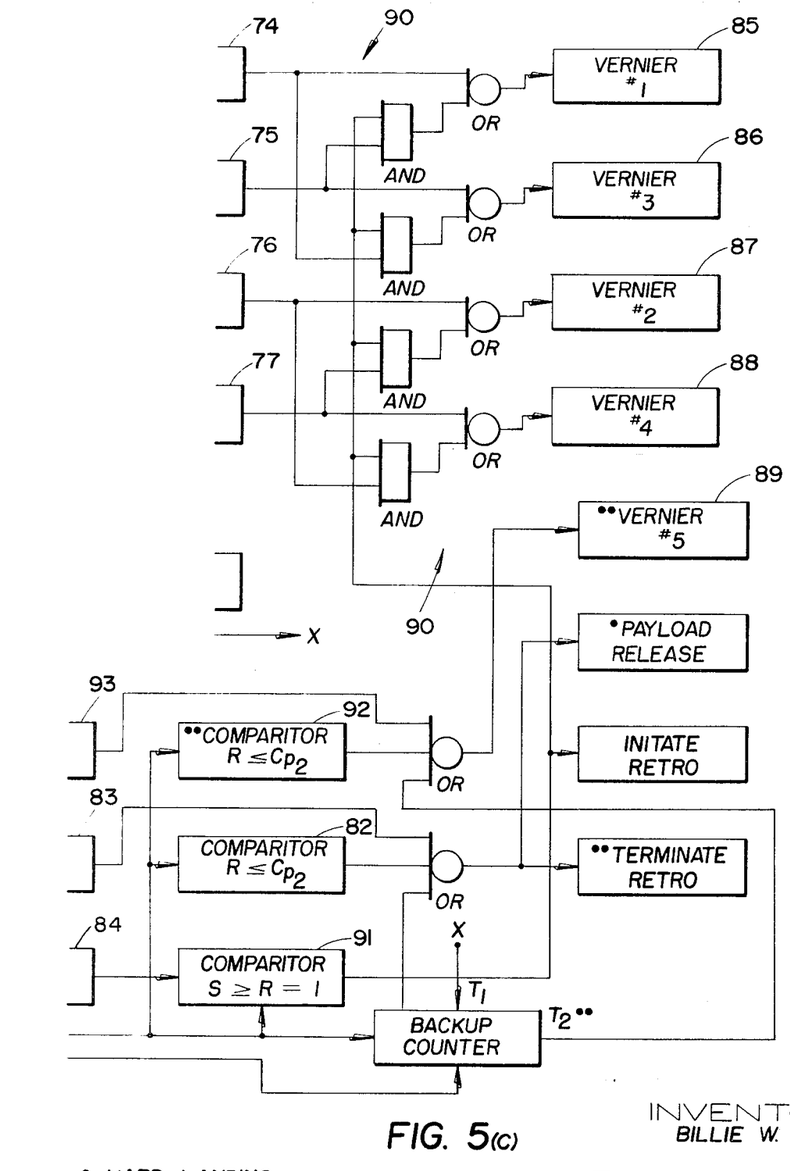

In the digital processing system of FIGS. 5a-5c the vehicle steering commands are derived by performing a ratio count of each doppler shift $D_1$ to $D_4$ as compared to $D_5$. Frequency trackers 46, 47, 48, 49 and 50 are provided in series with the outputs of the detectors 36 to 39 and 26 to remove the spectral side bands from the doppler returns and may be of any type that will provide a pure frequency output.

Looking now to an example of the logic network which compares the doppler shift of the central beam 5 and that of one of the radial beams (1, for example), it is seen from the diagram of FIG. 5a that the $D_5$ signal is fed to a binary counter 52 whose number of stages is determined by the vehicle constraints. $D_5$ signal is also fed to the A input of an inhibit gate 60. The output of the $D_5$ counter 52 is fed to the A input of gate 61 and to the I (inhibit) input of gate 60.

The $D_1$ signal is fed to a binary counter 56 having the same number of stages as the $D_5$ counter 52 and also the B input of gate 61. The output of the $D_1$ counter 56 is fed to the B input of gate 60 and to the I input of gate 61.

The output of the inhibit gate 60 is directed to a three input "or" gate 70 and is there mixed with the output of inhibit gate 65 and the pitchdown rate input in a manner well known in the art. The total count from these three sources is directed to the "UP" counter 74 which produces an "up" control pulse for the ACS logic when the count reaches a certain predetermined level.

The "down" counter 75, the "right" counter 76 and the "left" counter 77 are similarly connected through "or" gates 71, 72 and 73 respectively which "or" gates have inputs from the pairs of inhibit gates 62, 63, 64, 65, 66 and 67, as shown in FIG. 5B, in order to process the $D_2$, $D_3$ and $D_4$ signals to provide all necessary commands for steering control in both pitch and yaw. The $D_2$, $D_3$ and $D_4$ signals are compared with the $D_5$ signal as in the case of $D_1$, described above and in accordance with the equations previously derived for the computation of $V_x$ and $V_y$.

All counters are reset by the output of an "and" gate 79 or by the generation of the ACS control pulse.

The function of the ACS logic is to determine which thruster of the ACS controls will be activated or deactivated by a given control signal.

In addition to utilizing the $D_5$ center beam signal for comparison to the returns of the radial beams $D_1$ to $D_4$, the $D_5$ frequency tracker outputs are utilized in a "distance to go" computer which solves an equation of the form $S - aV^2 + bV + c$, where $V$ is the $D_5$ velocity and a, b and c are constants applicable to the characteristics of the vehicle (thrust to weight ratio, etc.).

The output of the "distance to go" computer (S) 84 is compared with the radar range (R) computer 51 and when $S = R$ the thrust system is turned on. The main retrorockets will operate until a "retro-terminate" signal is generated by R or $D_5$ falling below a preset value and determined by the comparitors 82 and 83. The vernier thrust controls 85, 86, 87, 88 and 89 are controlled by the ACS logic circuitry, generally indicated by reference numeral 90 which combines the attitude steering commands from the counters 74 through 77 with the thrust control commands from the comparitor 91 to produce a set of commands which will produce overall vehicle control. The comparitors 92 and 93 serve to set a lower limit on velocity and range for vernier thrust cut-off and are intended to eliminate all thrust prior to touchdown.

Figure 6A:
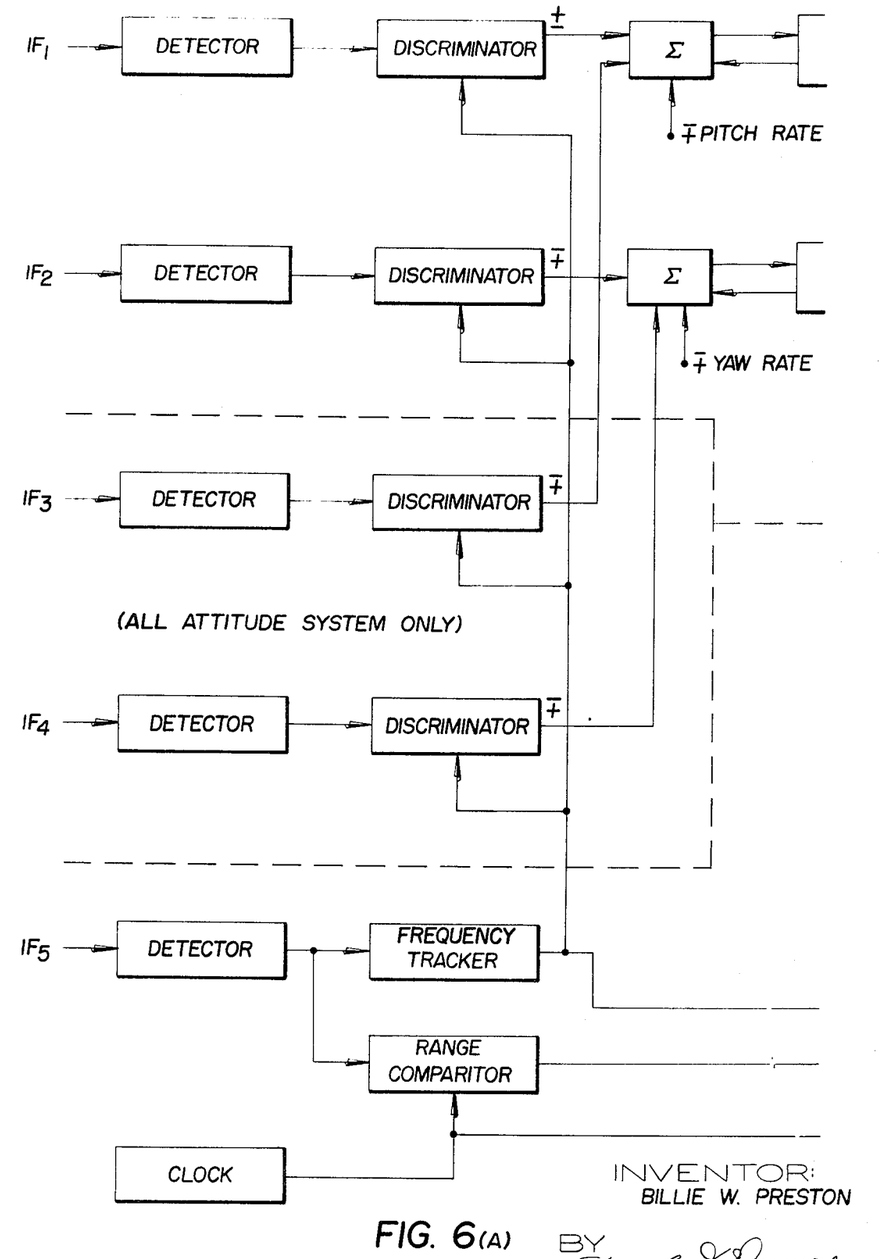
FIGS. 6a–6c is a block diagram of the alternative hybrid data processor of the present invention.
Figure 6B:
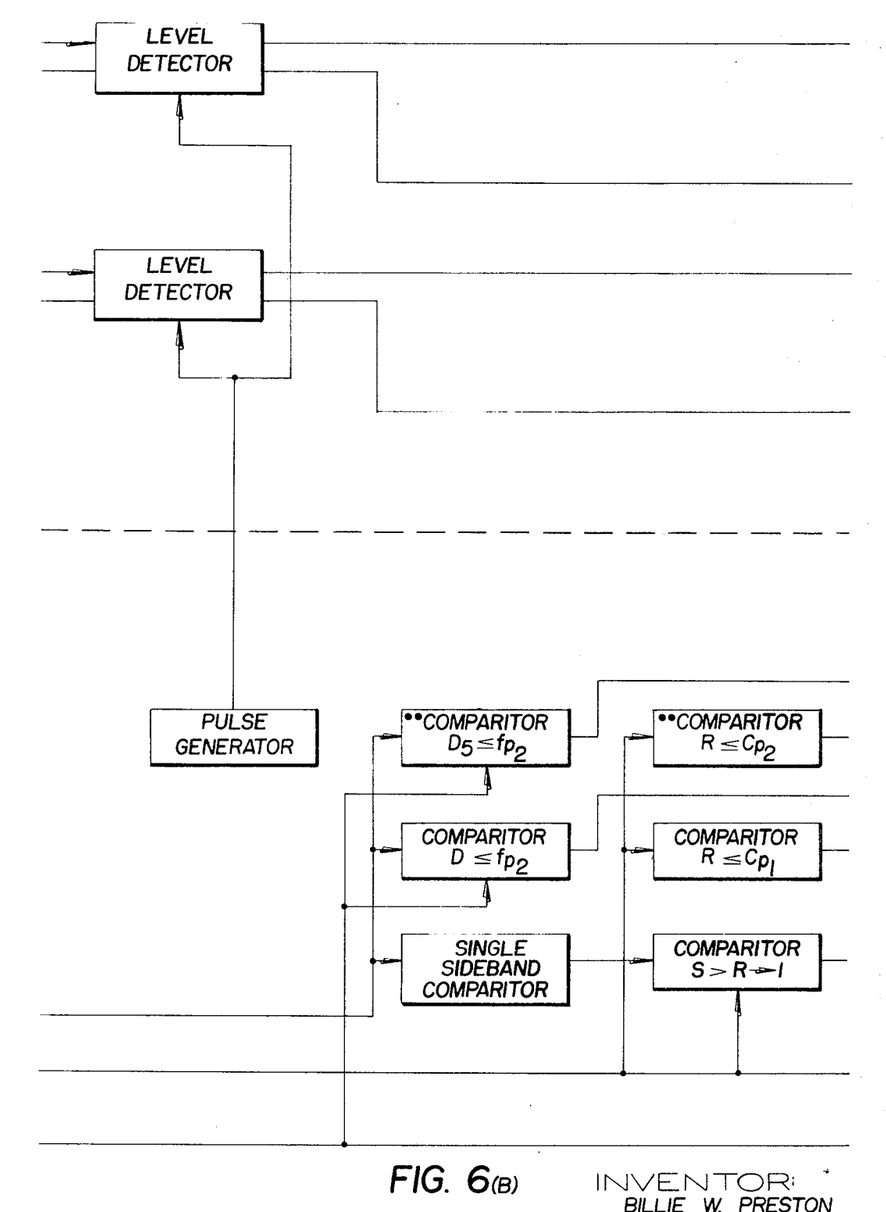
Figure 6C:
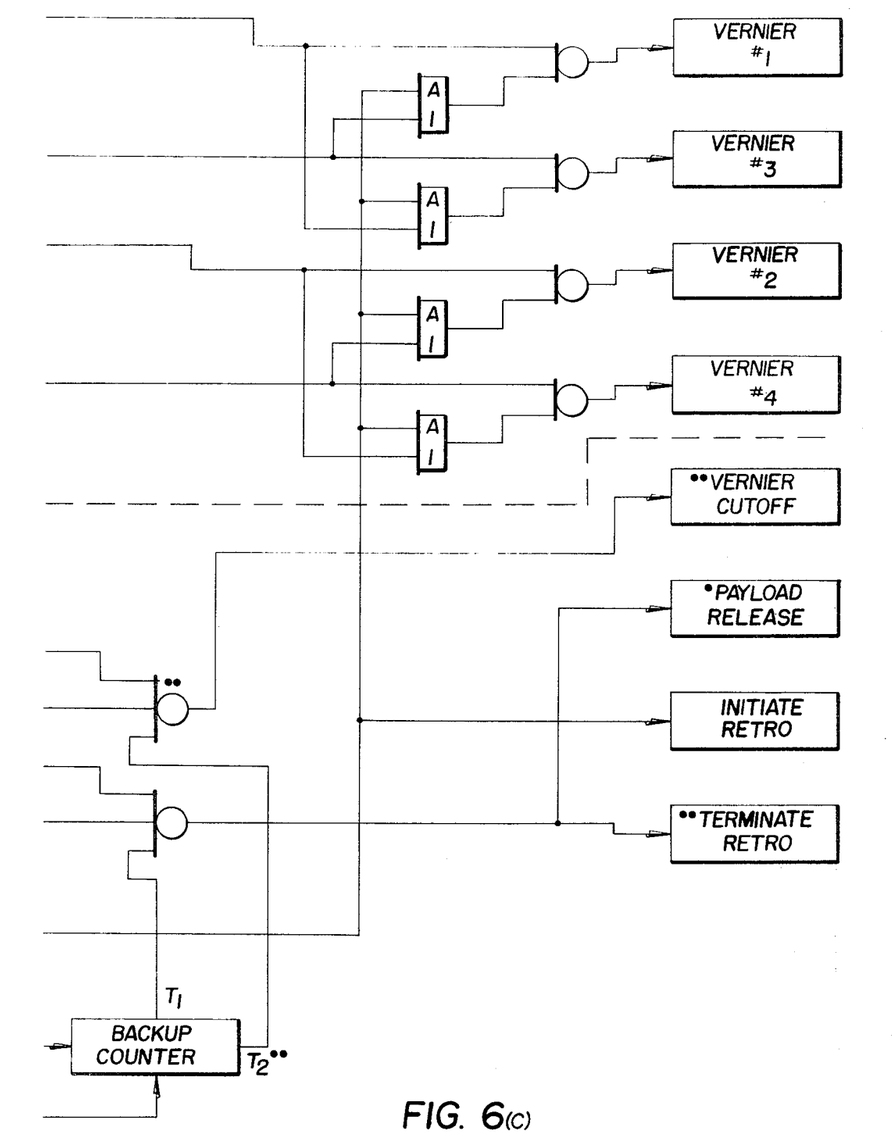

The hybrid logic flow FIGS. 6a - 6c is the same for $D_5$ as in the digital case to provide the range (R) and velocity ($D_5$) inputs to the logic. However, no frequency trackers are included on the four velocity beams. Instead a discriminator is provided to compare the doppler spectrum from each beam to the $D_5$ tracker output; deviation will produce a ± DC error signal which is converted to control signals and then processed in the same manner as the output of the digital processor. This technique requires only about one-quarter of the hardware used for a full digital system and represents an approach to the minimum practical system.

It should be noted that both systems may use rate damping for stabilization. These rate signals may be obtained from rate gyros or other inertial elements or derived from the radar velocity error signals themselves.

I claim:

1. A method of controlling the attitude and terminal descent of a space traveling vehicle which is provided with a retrothrust system and a plurality of attitude control thrusters, comprising the steps of:

transmitting a first electromagnetic doppler radar beam of frequency $F_1$ parallel to the roll axis of the vehicle;

transmitting a plurality of second electromagnetic doppler radar beams of frequency $F_2$ radially of said first beam, where $\cos^{-1}(F_1/F_2)$ equals the angle between the said first beam and each of the said second beams, and where $F_1$ and $F_2$ are coherent frequencies;

receiving the reflected returns from the said transmitted beams; and generating control signals for the attitude control thrusters as a function of the detected differences between the doppler frequencies of the reflected beams.

2. The method of claim 1 and further comprising of steps of:

modulating the said first beam;

processing the received return from the modulated first beam to obtain range information; and generating a control signal for the retrothrust system as a function of the range information.

3. The method of claim 2 including the further step of transmitting said second beams as four equi-spaced beams.

4. In a space vehicle adapted for soft landing including;
- a retrothrust system means directed longitudinally of the vehicle roll axis; and
- roll, pitch and yaw attitude thrust producing means operative attached to the vehicle, the improvement consisting of:
- doppler radar means carried by said vehicle and including:
- means for generating and transmitting a central radar beam of frequency $E_1$ along an axis parallel to the roll axis of the vehicle;
- means for generating and transmitting at least two non-coplanar beams of frequency $F_2$ which are directed radially from the axis of the said central beam;
- where $COS^{-1}(F_1/F_2)$ equals the angle between the longitudinal axes of the central beam and each of the said non-coplanar beams, and where $F_1$ and $F_2$ are coherent frequencies;
- receiving means for receiving the reflected returns of the said radar beams; and
- processing means for comparing the doppler shifts in the said beams and generating control signals as a direct function of the differences in the doppler shifts of the said radar beams.

5. The combination of claim 4 wherein the doppler radar means further includes:
- an oscillator for generating radio frequency energy;
- a frequency multiplier in series with the oscillator output;
- a modulator in series with the output of the multiplier; and
- antenna means connected to the modulator output.

6. The combination of claim 5 wherein the receiver means includes
- a receiving antenna for receiving the reflection of the central roll axis beam;
- local frequency producing means producing frequency $LF_1$;
- mixer means combining frequency $LF_1$ and the receiving antenna output;
- amplifier and detector means in series with the output of the said mixer means;
- a plurality of receiving antenna for receiving the reflections of the plural radial beams;
- local frequency producing means producing frequency $LF_2$;
- second mixer means combining frequency $LF_2$ and the respective outputs of the plural receiving antennae;
- amplifier and detector means in series with each output of the said second mixer means.

* * * * *